3,763,293
PROCESS OF MOLDING GIANT ARTICLES OF STRUCTURED PLASTIC
Frank J. Nussbaum, New York, N.Y., assignor to Bischoff Chemical Corporation, Hicksvillle, N.Y.
Continuation-in-part of applications Ser. No. 10,920, Feb. 12, 1970, now abandoned, and Ser. No. 149,901, June 9, 1971, now Patent No. 3,671,168, the latter being a continuation of abandoned application Ser. No. 752,518, Aug. 14, 1968, and the former being a continuation-in-part of the same. This application Feb. 3, 1972, Ser. No. 223,334
Int. Cl. B06b 3/00; B29d 27/00; B29f 1/06
U.S. Cl. 264—23
10 Claims

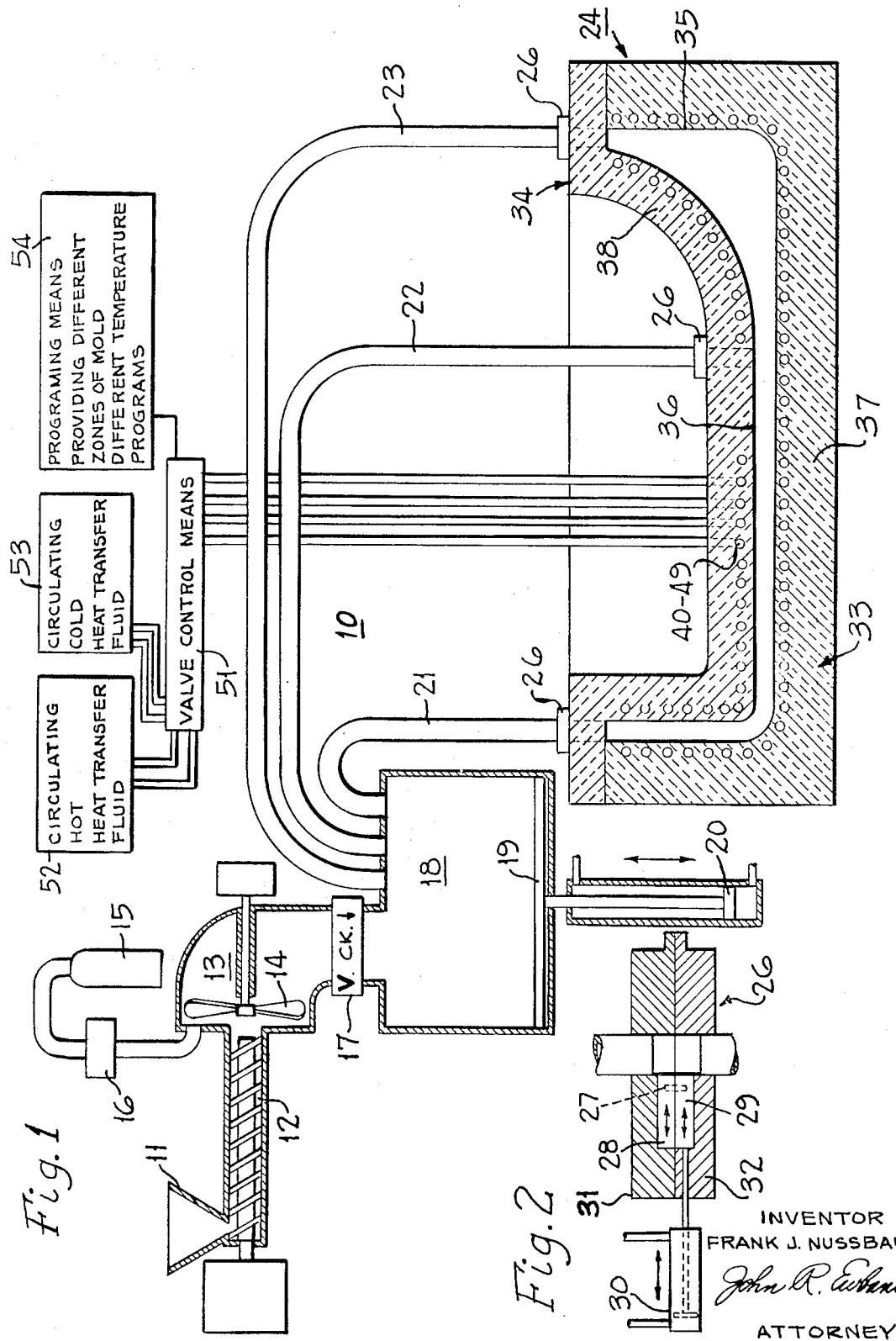

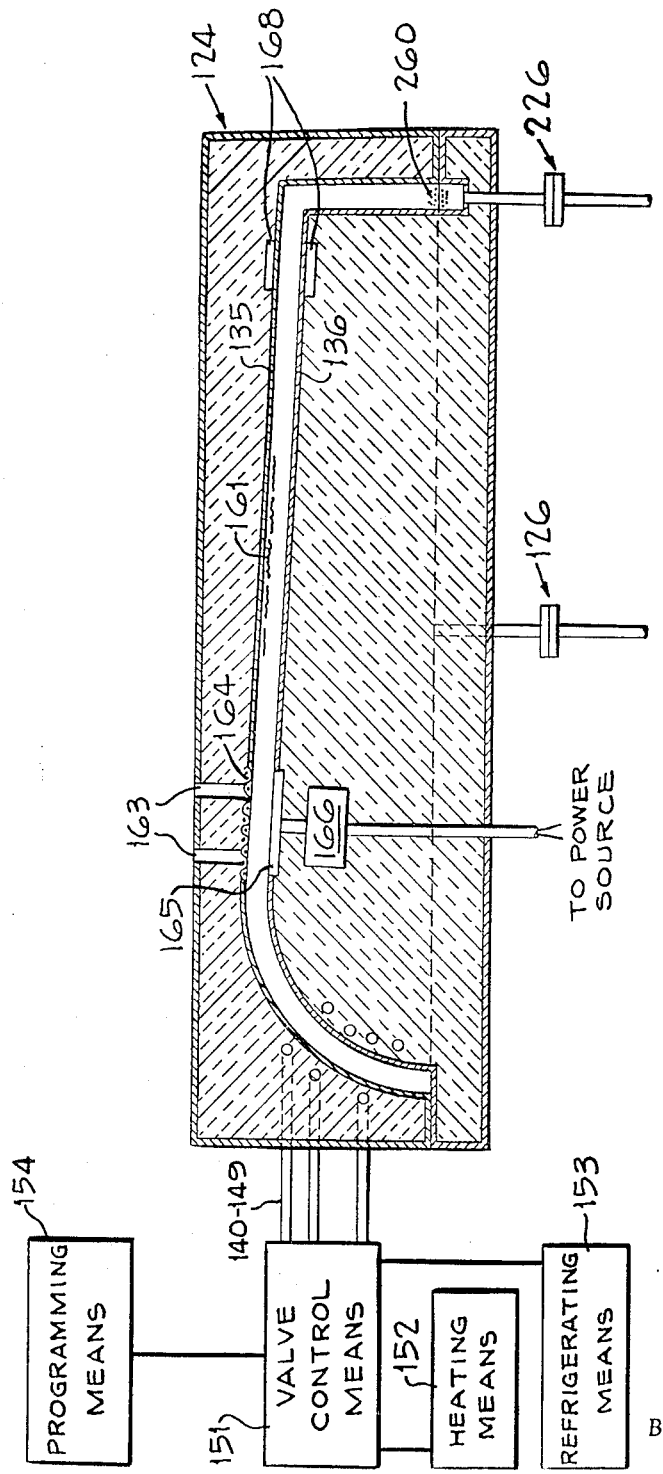

ABSTRACT OF THE DISCLOSURE

Giant sized plastic articles are mass produced with automation by low pressure injection molding. An article is designed to achieve the ultimate engineering performance of the internal structure in relation to its external shape, thus providing zones in which the internal structure is different from other zones, and such differences are imparted by the control of the molding process. The proportions of gas and molten plastic are carefully controlled prior to the accumulation of the feed in a batching device. A shot of feed flows through a distribution system into a structurizer mold having contoured walls of low specific heat and having heat transfer means permitting differential programming of the temperature of different zones. Before the article has solidified in the structurizer mold, the desired differences in internal structure are imparted by reason of the differential temperature programming, and/or differential pressure programming for different zones of the article. Various supplemental and/or optional features are disclosed.

CROSS REFERENCES TO PARENT APPLICATION

This application is in part a continuation of the application of Frank J. Nussbaum, Ser. No. 10,920, filed Feb. 12, 1970, now abandoned, which was a continuation-in-part of Ser. No. 752,518, filed Aug. 14, 1968, now abandoned and replaced by streamlined continuation Ser. No. 149,901 filed June 9, 1971, now Pat. 3,671,168, for Low Heat Capacity Mold for Injection Molding, and all the disclosure of the ancestor applications is deemed here reiterated.

GENERAL BACKGROUND OF THE INVENTION

Most plastic molding processes are concerned predominantly with imparting external shape to an article. High pressure injection molding methods are ordinarily operated to provide uniform internal characteristics throughout all zones of the article.

SUMMARY OF THE INVENTION

In accordance with the present invention, plastic articles of giant size are mass produced with reproducible differences in the internal structure of the article, whereby engineering advantages are achieved in relating the internal structure to the external shape and to its intended function. Such differences in internal structure are imparted by controlling the temperature patterns for one zone differently from the temperature patterns of another zone, that is, by differential programming of the temperature in a low pressure injection molding process. Certain internal structuring can also be accomplished by differential programming of the pressure. Desirably both temperature and pressure are differentially programmed during the time period which begins with the flow of the feed into the structurizer mold and ends with the removal of the article from the structurizer mold.

Gas is dispersed into a molten plastic that is, synthetic resinous thermoplastic material, the proportions being controlled prior to the accumulation of a shot in a batching device. A shot of the feed flows through a distribution system, and through a plurality of orifices into a structurizer mold for a giant article. A giant article is defined as an article weighing at least two kilograms. The contoured walls of the structurizer mold are of low specific heat whereby any heat sink or heat reservoir phenomena are minimized. Such contoured walls are generally metallic and good conductors of heat. The contoured walls define the cavity in which the article is molded. A plurality of heat transfer conduits provide zoned heating and zoned cooling to various zones of such contoured walls. Such heat transfer conduits are connected with valving means, a supply of hot circulating fluid, and a supply of cold circulating liquid, and a programming device sending liquids to different zones of the contoured walls so that, when desired, some zones of such walls can have temperatures significantly different from other zones. Particular attention is directed to the important result that the internal structure of the different zones of the giant article are varied by the differential temperature programming of the present invention. Gas is forced to migrate within the cavity of the structurizer mold by reason of the programming of various pressure regulating devices, such as a plurality of vents having valves sensitive to different pressures and/or valves at the plurality of orifices through which the mixture of gas and molten plastic enters the structurizer mold, said valves being regulatable as to flow rate and/or non-simultaneous opening or closing.

The gas employed in the mixture of gas and molten plastic serves three purposes. The density of selected zones of the article is controlled by the gas selectively retained in the article. The gas expands upon entering the structurizer mold. The flow of the mixture into the structurizer mold is aided by the difference in gas pressure incident to such expansion of gas entering the mold. Of particular importance, the gas imparts a significantly lower viscosity to the mixture than the viscosity of the same plastic at the same temperature, and such lower viscosity permits operation of the low pressure injection molding process. High pressure or conventional injection molding involves pressures of 60 kg./sq. cm., and low pressure injection molding is defined as molding in which the mixture flowing to the mold is maintained at a peak pressure lower than 30 kg./sq. cm. and in which the average pressure in the mold is significantly less than whatever is the peak pressure in the stream flowing to the structurizer mold.

In addition to the differential programming of the temperatures and/or pressures of the various zones of the structurizer mold, various other innovations can be employed to produce repeatably a predetermined internal structure. Different compositions can be injected into different zones of the structurizer mold. Reinforcement fibers can be introduced into selected portions of the structrizer mold or into the streams flowing to the structurizer mold. High frequency sound vibrations can be utilized for programmed controlled migration of gas or degassing the molten mixture of gas and plastic in selected zones of the structurizer mold. Gas can be injected into a selected zone.

Some illustrative embodiments of the invention are shown in the drawings which do not limit the general description of the invention. FIG. 1 is a schematic view of a system for filling a giant mold and differentially programming the temperature patterns for various zones of the article. FIG. 2 is a schematic view of a gate valve portion of the system of FIG. 1. FIG. 3 is a schematic view of a system employing both differential programming of temperature and differential programming of pressure, plus some supplemental techniques for modifying the internal structure of the article.

DETAILED DESCRIPTION

In thermal programming of different zones of a structurizer mold, any suitable apparatus may be employed for supplying a mixture of gas and molten plastic to the structurizer mold. In the drawings, there is a showing of apparatus intended merely schematically to illustrate the function of any apparatus which might be suitable for low pressure injection molding with a mixture of gas and hot molten plastic. The present invention is concerned primarily with the chronology and control of processing to achieve a novel overall process.

FIG. 1 is a schematic showing of a system 10 for the low pressure injection molding of giant plastic articles. A molding material is fed to a hopper 11 of a heated extruder 12 in which the material is melted and extruded into a mixing zone 13. Gas from a compressed gas cylinder 15 flows through a heated pressure regulator 16 into the mixing zone 13, in which the gas is dispersed into the extrudate to provide controlled proportions of gas and molten plastic in the mixture. A mixing blade 14 symbolizes the use of mechanical power in achieving reproducibly such controlled dispersion of gas in the molten plastic in the mixing zone 13, but any effective mixing apparatus can be used.

Substantially any material suitable either for casting or for injection molding is suitable as a molding material for low pressure injection molding. Polypropylene is an example of a molding material suitable for the present invention. In the mixing zone 13, the pressure, temperature, rate of flow and other variables are controlled substantially independently of the extruder 12, so that a melting device other than an extruder might be substituted in selected installations. Surge zones, alternately used batching devices, and other expedients can be employed in maintaining the adequate control of both the melting device and the mixing zone.

The mixture of gas and molten plastic flows from the mixing zone 13 through a check valve 17 into a batching apparatus such as an accumulator type device 18. The accumulator type device 18 serves to meter the amount of the mixture to be transferred to the distribution system by a preselected program, and coordinates the mixing and mold-filling steps. A piston 19 is retarded toward a preselected withdrawn position as the accumulator is filled to a preselected volume. After the accumulator has gathered sufficient mixture of gas and molten plastic for the preselected quantity programmed as a shot to the structurizer mold, the process is modified so that the gas and plastic mixture starts flowing from the accumulator into the distribution system. Optionally, a supplemental supply of high pressure gas can be introduced into the accumulator just prior to batch discharge. If the gas pressure exceeds 30 kg./sq. cm. then the system is taken outside the definition of low pressure injection molding. To the extent that excess gas or relatively high gas pressure in the accumulator provides a force pushing the mixture from the accumulator, through the distribution system, and into the structurizer mold, the mixture can be deemed to be released for flowing into the structurizer mold. It is convenient to treat the low pressure injection of the mixture as attributable particularly to the power device 20 (e.g. hydraulic cylinder), which actuates the piston 19 to push the selected volume of the molten mixture into the distribution system. It is the peak pressure of the plastic-gas mixture which must be low to achieve the advantages of low pressure injection molding, and pressures higher than 30 kg./sq. cm. may occur in auxiliary systems such as the power device 20.

The use of manifolds and feed distribution systems is important because the system requires that the cavity be filled through a plurality of spaced apart orifices whereby a giant article weighing more than 2 kg. is molded quickly. The mixture of gas and molten plastic flows through a plurality of tubes, shown schematically as 21, 22, and 23. The variations of pressure in tubes 21–23 are isolated from the constant pressure mixing zone 13 by any suitable means, such as a schematic check valve 17, which is closed during the brief period when the molten mixture flows through the feed distribution system to the structurizer mold.

Each of the tubes 21–23 is adapted to supply an appropriate portion of a structurizer mold 24 with the mixture of gas and molten plastic. Electrical heating means (not shown because conventional equipment in which molten plastic flows) are provided for the mixing zone 13, pressure regulator 16, extruder 12, accumulator 18, and each of the tubes 21–23, so that the temperature of the molten mixture is accurtaely controlled throughout the system from the extruder 12 to the end of each of the tubes 21–23.

The end of each tube is detachably secured to the structurizer mold by means of a coupling device 26 as shown in FIG. 2. Said coupling device 26 comprises a coupling member 32 on the structurizer mold 24 and a coupling member 31 on the tube. A gate valve 28 on the tube and a gate valve 29 on the structurizer mold 24 are designed to be fully open (as shown in FIG. 2) during one method of practicing the invention. Resilient means such as springs constantly urge each gate valve 28, 29 into a normally closed position. Power mechanism 30 shown schematically as a hydraulic cylinder is adapted to shift the gate valves 28, 29 into a preselected open position (partially open or fully open) and to maintain such open position as required by the programming, for the brief period corresponding essentially to the brief period of the flow of the mixture from the accumulator into the structurizer mold. Coordinating means 27 of the coupling device 26 requires the valves 28, 29 to open and close together except when a tube is uncoupled from the structurizer mold. The gate valve 29 on the structurizer mold includes cooling means for chilling the zone adjacent thereto. The coupling device 26 is indicated only in a very schematic manner in FIG. 1, but the operation thereof can be understood by reason of the description of FIG. 2.

One of the techniques available in the apparatus of FIG. 1 for selectively programming of pressure consists of programming the opening of the various valves 28 at controlled intervals, and/or maintaining at least one valve in a partially opened position. Any departure from simultaneous opening of all of the valves all of the way imparts different pressures to different zones of the structurizer mold. Planned programming of such differential pressures can modify the internal structure of the article. The differential programming of pressures at different zones of the structurizer mold can enhance the effect of the differential programming of temperatures in imparting different internal structuring to the different zones of the giant article. As soon as the predetermined batch has left the accumulator 18, that is, when the structurizer mold is filled, the actuation of the piston 19 is stopped, and the gate valves 28 and 29 are returned to their normally closed positions.

Particular attention is directed to the temperature programming feature whereby the different zones of the article develop different internal structures. Some such different structures are attributable in part to the migration of gas from one zone to another zone, sometimes by reason of a tendency of a gas to flow from a hot zone to a cold zone. Some such different structures are attributable to the degassing of molten plastic maintained at a sufficiently hot temperature (and thus at a viscosity low enough) that degassing requires only a moderate difference in pressure and/or temperature. The gas degassed from the mixture of molten plastic and gas is vented from the structurizer mold in a controlled manner through vents, thus avoiding the variations and uncertainties inherent in using the parting line between the two separable portions of the mold as the vent for excess gas.

A structurizer mold comprises a lower box 33 and an upper box 34. A bathtub shaped cavity is defined by the combination of a contoured wall 35 in the lower box 33 and a contoured wall 36 in the upper box 34. A bathtub is an example of a giant plastic article having a weight greater than two kilograms. Each contoured wall 35, 36, is relatively thin and of low specific heat in accordance with the teachings of cross-referenced Nussbaum application Ser. No. 725,518. On the back of each contoured wall are a plurality of heat exchange means designated generally by the numbers 40–49. It is especially significant that each heat transfer means can be programmed differently, so that one zone of a contoured wall could be heated simultaneously with the cooling of a closely adjacent zone. Some of the heat transfer conduits are secured to the contoured wall 35, and cellular insulation 37 helps to position and secure such wall in its box 33. The various zones of the cellular insulation 37 can expand and contract with adjacent zones of the wall 35 and the box 33 without disruption of the bonding, even though the speed and magnitude of the temperature changes would disrupt bonds to materials other than cellular insulation. Similarly, cellular insulation 38 positions contoured wall 36 in its box 34.

The heat transfer means 40–49 are ordinarily tubes through which heat transfer liquid can pass to heat or cool the zone of the contoured wall with which the tube is associated. A supply of hot liquid and means for circulating it is designated as 52. Cold liquid is pumped and circulated to and from a cold liquid supply 53. A system of valves 51 associates the inlet and outlet of each heat transfer tube 40–49 with the hot liquid supply 52 and the circulating cold liquid supply 53. Programming means 54 regulates the valves in the valve control system 51, and thus directs hot or cold liquid to each zone of the contoured walls in accordance with a preselected program. The giant article is designed to have internal structure in selected zones different from the internal structure in other zones, and the programming is selected to achieve such differences in internal structure by the control of the temperature of the various zones of the contoured walls 35, 36.

A zone can be programmed so that there is either a rapid or a slow rate of temperature change. A zone of a contoured wall can be either chilled, or at ambient temperature or at a warm temperature or at a superheated temperature (hotter than the mixture of molten plastic and gas) prior to the flow of the molten plastic and gas into the structurizer mold. Soon after the plastic starts to flow into the structurizer mold, the temperature of the liquid supplied to a heat exchange means for a particular zone can be the same or different with respect to the initial temperature. Various periods can be described, but within a few minutes after the beginning of the flow of the molten plastic and gas into the structurizer mold, it is usually desirable to supply to each of the heat transfer means a liquid which is cooler than the mixture of gas and molten plastic which is solidifying near a center portion of the structurizer mold.

The final stages of the cooling of the article may be programmed to be uniformly the same throughout all zones of the structurizer mold, inasmuch as the internal structure of the article by that time has been established by the hardening of the internal portion of the article. The heat transfer through the thin contoured walls of the structurizer mold is excellent. There is less efficient heat transfer from the skin to the central portion of the article, inasmuch as the presence of gas cells enhances the insulating characteristics of the plastic. Hence it is often desirable to super cool the skin to a temperature so cold as to hasten the solidification and cooling of the central portion of the article.

Efficient use of the total investment in equipment is the desirable goal. After the different zones have been given their different internal structures, further cooling of the article in the structurizer mold may be rapid to make effective use of the capital investment in the structurizer mold and related equipment. To the extent permitted by capital costs, etc., the cooling can be prolonged sufficiently, to achieve a smaller temperature difference between the relatively cool surface and relatively hot central portion of the article. Because the structurizer molds of the present invention are relatively less costly than the molds for conventional high pressure injection molding, and because the clamping pressures are so much less per square foot of cross sectional area at the parting line than in conventional high pressure injection molding, there are incentives for using a plurality of the structurizer molds on a companion basis. Thus one apparatus for feeding the mixture of gas and molten plastic to the structurizer mold can be used successively for a repeating series of structurizer molds, with each article being cooled during a period longer than required for the preparation of a single shot of material.

The article should not be removed from the structurizer mold until there has been sufficient solidification to permit appropriate handling, even if central portions thereof may retain some degree of plasticity. Centrifuging and related produces can further modify the internal structure of such unsolidified central portion after removal from the structurizer mold, but such modifications are as independent from the present invention as the conventional utilization of inserts for altering the internal structure of an article.

Gas which has been separated from the mixture flowing into the structurizer mold can be readily induced to migrate through any clear path, but the ease with which gas separates from the mixture of gas and molten plastic fed to the structurizer mold is dependent upon a variety of factors, including temperature of the adjacent contoured wall, viscosity of the plastic, temperature of the plastic, chemical composition of the gas, type of surfactant, if any, employed in the molten plastic for stabilizing gas cells, and other factors. The temperature programming of the contour wall which is effective in degassing one composition containing a very high proportion of gas in a very low viscosity molten plastic will not degas a composition containing only a small amount of gas in a well-stabilized relatively viscous molten plastic. The invention is most readily understood in connection with feed compositions which are readily degassed, with engineering modifications of the programming to achieve the desired variations of internal structure when using other types of feed compositions.

When a feed mixture consisting of relatively fluid plastic and a high proportion of gas flows at low injection pressure for contacting a contoured wall at an even higher temperature (i.e. superheated) the feed is degassed, and can flow along the contoured wall until it reaches a suitable vent, and the plastic can undergo densification into a thick skin. When such a feed contacts a sufficiently chilled contoured wall, the composition can solidify with minimized skin formation. However, if the contoured wall is then reheated to melt the surface layer, and permit flow of heat and pressure from the central zone, a skin can be formed prior to the cooling of the article.

The internal structure of one zone can be made different from the internal structure of another zone by suitable differential pressure programming. After a shot of feed has flowed into the structurizer mold, and while portions of the article retain some plasticity, a portion of the article can be compressed, desirably simultaneously with appropriate degassing, to provide a zone of greater density than other zones. Thus a hinge portion of a door can be densified by the compression and contraction of a portion of the structurizer mold during the period after the flow of the feed into the mold and before the removal of the article from the mold.

The structurizer mold is always filled through a plurality of orifices, and ordinarily such filling is simultaneously through all orifices through wide open valves. The simplest manner of altering internal structure by programming of differential pressure is by the programming of the valves in partially open non-uniform positions. Moreover, the non-simultaneous opening of the valves for the plurality of orifices achieves an advantageous pressure programming even without controlled partial opening of the valves.

It is often desirable to provide differential programming for both temperature and pressure, inasmuch as each contributes to the effectiveness of the structuring to provide zones having an internal structure different from the internal structure of other zones.

As shown in FIG. 3, any of a variety of supplemental procedures can enhance the advantageous differential programming of the temperature of various zones of a structurizer mold. A structurizer mold 124 in FIG. 3 comprises heat transfer means 140–149 on the backs of contoured walls 135 and 136 defining a cavity for a boat, a giant plastic product in which different zones can advantageously have different properties. The boat weighs more than two kilograms. Of importance, a programming means 154 regulates a valve control system 151 and the circulation of fluids to and from the heat transfer means 140–149 and the circulation of cold fluid from refrigerating means 153 and the circulation of hot fluid from heating means 152.

Prior to the entry of the molten mixture, glass fibers can be placed in the hull portion of the mold cavity. When the molten plastic is injected, the glass fibers tend to concentrate in the skin, and thus impart greater toughness and tear resistance to the skin. The fiber glass strengthened skin is indicated at 161. Relatively short (e.g. 1 mm. to 5 mm.) glass fibers can be injected into the mixture of gas and molten plastic before the mixture flows into the structurizer mold 124.

When the molten plastic flows into the structurizer mold, the gas filling the empty cavity is displaced and forced to migrate. In some prior art methods, the two parts of the mold were spaced apart sufficiently to permit dissipation of such displaced gas at the parting line while still keeping such vent at the parting line from being of such dimensions as to promote leakage of plastic. Any such random venting of gas at the parting line should be avoided in order to regulate the programming of pressure.

The gas in the mold cavity prior to injection of the plastic is vented through gas vents 163 provided at selected portions of the structurizer mold 124. Valves responsive to pressure and/or gas flow are desirably positioned to control such venting in a predetermined manner. Such vents are also desirably adapted to vent gas migrating from the mixture of gas and molten plastic, whereby greater densification of the plastic is achieved. Screens 164 through which gas permeates readily, but which are barriers to the partially hardened viscous plastic, may aid the dissipation of gas through the vents. By programming the different vents to release gas from the cavity at different pressures, the pressure imparted to different zones of the cavity can be different, thereby imparting migration of gas and imparting different internal structuring to different zones of the article.

A centerline of the boat benefits from significant densification. At least one vibrating bar 165, adapted to vibrate at ultrasonic frequencies modifies the hot mixture within the zone of influence of the vibrations. Power means 166 vibrate each bar 165, at ultrasonic frequencies. The ultrasonic vibrations promote the migration of gas and degas the mixture of gas and molten plastic. The gas separated from the mixture migrates to the vent 163 from which it escapes from the structurizer mold. Thus in this zone the molten plastic is densified. When using such ultrasonic densification feature, it can be advantageous to preheat that portion of the structurizer mold adjacent the vibrating bars 165 and the coupling 126 through which the molten plastic enters to a controlled temperature. The bars are vibrated advantageously while the plastic is hot enough and sufficiently molten for the gas to migrate therefrom (e.g. during the filling of the mold).

A high frequency field adapted to heat the plastic can be provided at selected zones of the structurizer mold using electrodes 168 to establish such field. The speed of heating and the ability to focus the heating at tiny zones are advantages of the radio wave type of electromagnetic field for heating a zone of the structurizer mold. It is sometimes desirable to include a withdrawable needle in the zone thus locally heated, whereby a controlled volume of gas is blown into a central portion of the molten (and generally reheated) plastic to create a controlled void or a plurality of controlled cells which remains after the cooling (generally recooling) of the plastic.

A minor portion of the boat is formed of a mixture of gas and one kind of plastic (e.g. chlorinated polyethylene containing about 35% chloride). The major portion of the boat is formed of a mixture of gas and another kind of plastic (e.g. polypropylene). The plastics are selected by reason of their general miscibility when molten and the stability of the solid blends prepared from mixtures of the molten plastic. In making the boat of two varieties of plastic, the streams of mixture of gas and molten plastic advance toward each other as advancing waves within the cavity of the mold, and blend and mix and interpenetrate each other. The low viscosity of the colliding waves, the pressure of the injection system and other factors promote such interpenetration and blending. Such effective interpenetration of the composition in the blending zones makes more advantageous the selective programming of temperature of the blending zone 260, so that the compositions harden to provide an acceptable unitary structure.

A coupling member 126 on the boat 124 is attached to a tube providing a mixture of gas and one kind of molten plastic, and a coupling 226 is attached to a tube providing a mixture of gas and another kind of molten plastic. The controlled flow of the plastics into the mold leads to at least one merging zone 260 in which the cellular cores bond to each oher. The temperature programming of the various merging zones 260 in which there is a merging of the two plastic compositions is significantly responsible for such successful blending of the two different plastic compositions. The heat transfer conduits 140–149 provide such temperature programming of merging zone 260.

In the making of shower stalls or other apparatus having pipes embedded therein, it is advantageous to utilize the pipes as a part of the heat transfer system, participating in the programming of the differential temperatures, to achieve the predetermined differences in internal structure in different zones of the article. Such use of the pipes embedded in the article for heating and cooling different zones of the article supplements the differential programming of the temperatures of the heat transfer tubes of the structurizer mold.

As a further example of an embodiment of the method, reference is made to the preparation of the type of door which could be used architecturally as a door between rooms. Simulated wood carving would ornament the door. Polycarbonate resin pellets are melted and plasticized in an extruder. Compressed nitrogen is mixed with the polycarbonate resin to provide a hot mixture of gas and molten plastic and the controlled quantity of mixture flows through the distribution system to the plurality of orifices. The waves of mixture flow from the orifices and thus approach each other within the cavity of the structurizer mold. The waves blend into a molten composition. The gas vents are positioned near the blending zones near the edges of the door and other appropriate locations. The gas initially in the structurizer mold migrates toward such vents as such initial gas is displaced by the incoming plastic. Moreover, a significant portion of the gas flowing through the orifices into the cavity is dissipated through such gas vents, so that the gas content of the door ultimately produced is less than the gas content of the pressurized mixture of gas and molten plastic in the accumulator. The merging zones and the zones near the orifices of the structurizer mold are pre-heated so that the incoming mixture contacts hot walls without instantaneous chilling of the plastic. After the structurizer mold is filled, the heat transfer conduits adjacent the preheated zones are cooled by circulating cold fluid. Immediately after the mold is filled, a zone which initially had been precooled is reheated to melt the surface and to erase the flow lines attributable to the cold surface initially contacted and then the heat transfer conduits for this zone are cooled by circulating cold liquid. After the cooling of the structurizer mold, the door is removed from the structurizer mold and found to have the characteristics deemed desirable for such a molded door.

This invention is concerned with the concept of using the mixture of gas and molten plastic for the making of an article, and so controlling the parameters affecting the structurizer mold during the filling and during the period until the structurizer mold is opened to remove the product so that different zones of the product have differences attributable to the preselected structuring method, and particularly to the temperature programming of selected zones differently from the temperature programming of other zones.

The invention claimed is:

1. In the process in which a plastic article is produced by the low pressure injection molding of a material consisting predominantly of a mixture of gas and molten plastic into a mold cavity at a peak pressure lower than 30 kg./cm.², the cooling of the material as a plastic article is formed, and the removal of a relatively cool plastic article from the mold, the improvement which consists of:

providing a mold cavity for a giant plastic article having a weight greater than two kilograms, said article having zones with an internal structure different from the internal structure of other adjacent zones of said article, there being a plurality of heat transfer conduits at the rear faces of the walls defining the cavity, whereby selected zones of the cavity wall may be maintained at temperatures different from other adjacent zones of the cavity wall;

providing controls for a programming of structuring adapted to achieve such differences in internal structure;

preparing a mixture of gas and molten synthetic resinous thermoplastic material in which mixture the proportions of gas and synthetic resinous thermoplastic material are reliably controlled;

initiating the flow of streams of said mixture through a distribution system and through a plurality of spaced apart orifices into a cavity for filling the cavity and imparting external shape to said giant article;

terminating the flow of mixture into said cavity;

subsequent to said initiation of the flow of the mixture into the cavity but prior to the removal of the article from the mold, structuring the material in the cavity by imparting predetermined different characteristics to selected zones of the article, said different characteristics including different densities, said structuring being accomplished by predetermined programming of the temperature of selected zones of the article differently from the predetermined programming of the temperature of other adjacent zones of the article while maintaining said article at the low pressure of low pressure injection molding, said programming controlling the temperature of said heat transfer conduits at the rear face of the walls defining the cavity and causing migration of gas from one article zone to another;

cooling the article until it is solidified sufficiently to be handled while maintaining said article at said low pressure; and withdrawing as the product of the process a giant plastic article having a weight greater than two kilograms, said article having zones with predetermined internal structure different from the predetermined internal structure of other adjacent zones.

2. In the process in which a plastic article is produced by the low pressure injection molding of a material consisting predominantly of a mixture of gas and molten plastic into a mold cavity at a peak pressure lower than 30 kg./cm.², the cooling of the material as a plastic article is formed, and the removal of a relatively cool plastic article from the mold, the improvement which consists of:

providing a mold cavity for a giant plastic article having a weight greater than two kilograms, said article having zones with an internal structure different from the internal structure of other adjacent zones of said article, there being a plurality of gas vents from the cavity, whereby selected zones of the cavity may have gas pressures different from other adjacent zones of the cavity;

providing controls for a programming of structuring adapted to achieve such differences in internal structure;

preparing a mixture of gas and molten synthetic resinous thermoplastic material in which the proportions of gas and synthetic resinous thermoplastic material are reliably controlled;

initiating the flow of streams of said mixture through a distribution system and through a plurality of spaced apart orifices into a cavity for filling the cavity and imparting external shape to said giant article;

terminating the flow of mixture through said plurality of orifices into said cavity;

subsequent to said initiation of the flow of the mixture into the cavity but prior to the removal of the article from the mold, structuring the material by imparting predetermined different characteristics to selected zones of the article, said different characteristics including different densities, said structuring being accomplished by predetermined programming of pressure of selected zones of the article differently from the predetermined programming of the pressure of other adjacent zones of the article while maintaining said article at said low pressure, said programming controlling the opening of and gas flow rate from the plurality of vents and the opening of and the mixture flow rate through the plurality of orifices and causing migration of gas out of the cavity as well as from one article zone to another;

cooling said article until it has solidified sufficiently to be handled, said article being maintained at said low pressure during such cooling; and withdrawing as the product of the process a giant plastic article having a weight greater than two kilograms, said article having zones with predetermined internal structure different from the predetermined internal structure of other adjacent zones.

3. In the process in which a plastic article is produced by the low pressure injection molding of a material consisting predominantly of a mixture of gas and molten plastic into a mold cavity at a peak pressure lower than 30 kg./cm.², the cooling of the material as a plastic article is formed, and the removal of a relatively cool plastic article from the mold, the improvement which consists of:

providing a mold cavity for a giant plastic article having a weight greater than two kilograms, said article having zones with an internal structure different from the internal structure of other adjacent zones of said article, there being a plurality of heat transfer conduits at the rear faces of the walls defining the mold cavity, whereby selected zones of the cavity wall may be maintaind at temperatures different from other adjacent zones of the cavity wall, and there being a plurality of gas vents from the cavity, whereby selected zones of the cavity may have gas pressures different from other adjacent zones of the cavity;

providing controls for a programming of structuring adapted to achieve such differences in internal structure;

preparing a mixture of gas and molten synthetic resinous thermoplastic material in which the proportions of gas and synthetic resinous thermoplastic material are reliably controlled;

initiating the flow of streams of said mixture through a distribution system and through a plurality of spaced apart orifices into a cavity for filling the cavity and imparting external shape to said giant article;

terminating the flow of mixture through said plurality of orifices into said cavity;

subsequent to said initiation of the flow of the mixture into the cavity but prior to the removal of the article from the mold, structuring the material by imparting predetermined different characteristics to selected zones of the article, said different characteristics including different densities, said structuring being accomplished by predetermined programming of the temperature and predetermined programming of the pressure of selected zones of the article differently from the predetermined programming of the temperature and the predetermined programming of the pressure, said programming controlling the temperature of said heat transfer conduits at the rear face of the walls defining the cavity and controlling the opening of and the gas flow rate from the plurality of vents and the opening of and the mixture flow rate through the plurality of orifices and causing migration of gas out of the cavity as well as from one article zone to another of other adjacent zones of the article while maintaining said article at said low pressure;

cooling the article until it has solidified sufficiently to be handled, said article being maintained at low pressure during such cooling; and withdrawing as the product of the process a giant plastic article having a weight greater than two kilograms, said article having zones with predetermined internal structure different from the predetermined internal structure of other adjacent zones.

4. The method of claim 2 in which a plurality of vents provide differences in pressure in different zones of such cavity by controlled programming of the pressure.

5. The method of claim 4 in which the structurizer mold cavity, prior to injection, has a controlled gas pressure only slightly less than the gas pressure in the mixture of gas and molten synthetic resinous thermoplastic material in the streams approaching the orifices, so that each flow of the mixture from the orifices into more remote portions of the cavity involves an advancing wave front of material, the advancing wave fronts approaching and blending with each other.

6. The method of claim 1 in which the article comprises a relatively low density core comprising gas cells and a relatively dense skin having predetermined variations of thickness, and in which fibrous reinforcements are incorporated into the article.

7. The method of claim 1 in which each of a plurality of different plastic compositions is injected into different zones of the cavity so that different molten synthetic resinous thermoplastic material compositions blend and bond together to form a unitary article.

8. The method of claim 1 in which ultrasonic vibrations in a selected zone of the cavity prompt the migration of gas from such selected zone during at least a portion of the period while the synthetic resinous thermoplastic material, is substantially molten, whereby a major portion of the gas migrates from the zone influenced by the ultrasonic vibrations, and whereby synthetic resinous thermoplastic material, having a different density is formed at that zone after the termination of such vibrations and after the cooling of that zone.

9. The method of claim 1 in which the programming of temperature controls the flow of circulating hot liquid and the flow of circulating cold liquid through zones adapted to impart transfer of heat efficiently and adapted to provide efficient reversals of heat transfer, whereby selected zones of the cavity are heated and cooled by such circulating liquids.

10. The method of claim 1 in which a high frequency electromagnetic field is employed for heating a selected zone of the cavity.

References Cited
UNITED STATES PATENTS

| | | | |
|---|---|---|---|
| 2,898,632 | 8/1959 | Irwin et al. | 264—48 |
| 3,072,584 | 1/1963 | Karpovich | 264—23 |
| 3,099,516 | 7/1963 | Henrickson | 264—48 |
| 3,436,446 | 4/1969 | Angell, Jr. | 264—50 X |

ROBERT F. WHITE, Primary Examiner

J. H. SILBAUGH, Assistant Examiner

U.S. Cl. X.R.

264—25, 40, 46, 48, 50, 327; 425—4, 130, 144, 145, 243, 817